United States Patent
Echols, Jr. et al.

(10) Patent No.: US 8,014,678 B2
(45) Date of Patent: Sep. 6, 2011

(54) POWER SUPPLY

(75) Inventors: Billy G. Echols, Jr., Jackson, MS (US); Neal D. Smith, Jackson, MS (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 964 days.

(21) Appl. No.: 11/424,165

(22) Filed: Jun. 14, 2006

(65) Prior Publication Data

US 2007/0292138 A1    Dec. 20, 2007

(51) Int. Cl.
*H04B 10/00*    (2006.01)

(52) U.S. Cl. ........ 398/115; 398/116; 398/117; 398/128; 398/121

(58) Field of Classification Search .......... 398/120, 398/121, 127, 125, 115–117, 113, 128, 137; 343/713–718
See application file for complete search history.

(56) References Cited

U.S. PATENT DOCUMENTS

| | | | |
|---|---|---|---|
| 4,039,467 A * | 8/1977 | Tucker | 252/587 |
| 5,150,243 A * | 9/1992 | Suzuki | 398/17 |
| 5,218,356 A * | 6/1993 | Knapp | 342/350 |
| 5,625,883 A * | 4/1997 | Leyten et al. | 455/41.1 |
| 6,194,993 B1 * | 2/2001 | Hayashi et al. | 340/10.34 |
| 6,351,530 B1 * | 2/2002 | Rahamim et al. | 379/399.01 |
| 6,437,685 B2 * | 8/2002 | Hanaki | 340/286.02 |
| 6,525,854 B1 * | 2/2003 | Takahashi et al. | 398/115 |
| 6,686,882 B2 * | 2/2004 | Petros et al. | 343/700 MS |
| 7,208,912 B2 * | 4/2007 | Ghabra et al. | 320/108 |
| 7,467,761 B2 * | 12/2008 | Yehezkeli et al. | 244/3.11 |
| 2003/0179818 A1 * | 9/2003 | D'Angelo et al. | 375/222 |
| 2003/0181162 A1 * | 9/2003 | Matula | 455/13.3 |
| 2004/0008992 A1 * | 1/2004 | Nishimura | 398/115 |
| 2005/0068629 A1 * | 3/2005 | Fernando et al. | 359/609 |
| 2006/0062515 A1 * | 3/2006 | Mahbobi | 385/24 |
| 2006/0062580 A1 * | 3/2006 | Mahbobi | 398/116 |
| 2009/0018429 A1 * | 1/2009 | Saliga et al. | 600/407 |

* cited by examiner

*Primary Examiner* — Ken N Vanderpuye
*Assistant Examiner* — Hibret A Woldekidan (57) ABSTRACT

A device includes a power module to produce a switched voltage and to convert the switched voltage into a waveform adapted to wirelessly pass through a structure. The device may include a data module to receive a wireless signal through the structure, where the wireless signal includes information, and to send the information toward a destination.

17 Claims, 6 Drawing Sheets

POWER SUPPLY

BACKGROUND OF THE INVENTION

Wireless devices, such as cellular telephones, are commonly used by individuals to communicate with another party. Wireless devices may use an antenna to receive a radio frequency (RF) signal. Call quality may depend on a signal-to-noise (SNR) ratio between the desired signal (i.e., the RF signal carrying information) and a noise signal. Call quality may be best when an RF signal does not pass through obstructions located between a transmitter (e.g., a wireless base station) and an antenna on the wireless device since obstructions may attenuate (i.e., may reduce) the desired signal, thereby lowering the SNR of the RF signal at the antenna.

For example, a wireless device may receive a strong RF signal when a user operates the wireless device outdoors in an open field. The same wireless device may receive a weaker signal when the user operates the wireless device inside a building since an RF signal may pass through windows, walls or ceilings of the building when traveling from a base station to the wireless device. An amplitude of the RF signal may be attenuated (i.e., may become lower in amplitude) when the RF signal passes through the windows, walls, or ceilings of the building. As a result, call quality may be degraded when the wireless device is operated in an environment where the RF signal passes through an obstruction before reaching the antenna of the wireless device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF PREFERRED EMBODIMENTS

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may employ an antenna that is located in an environment where the antenna will receive a signal having a higher SNR than if the antenna were located in another environment. For example, an antenna may be mounted on an exterior surface of a structure, such as an automobile window. The antenna may receive a stronger wireless signal when mounted on an exterior window surface as compared to a signal strength that the antenna would receive if the antenna were located inside the passenger compartment of the automobile. Implementations may couple power and wireless signals to the antenna, and antenna related components, mounted on the exterior window surface without requiring the use of penetrations, such as holes, through the window.

Implementations may produce a power waveform via an interior power module. The power waveform may be adapted to pass through the window to an exterior electronics module that may be co-located with the antenna. The exterior electronics module may convert energy in the power waveform into a voltage to power data components that are in the exterior electronics module. An interior electronics module may send data from an interior surface of the window to the exterior electronics module using an optical signal that is adapted to pass through the window. The exterior electronics module may receive the optical signal and may convert the optical signal into an electrical data signal. The exterior electronics module may modulate the electrical data signal so that the data can be transmitted to a destination via the antenna.

Exemplary System

Figure 1:
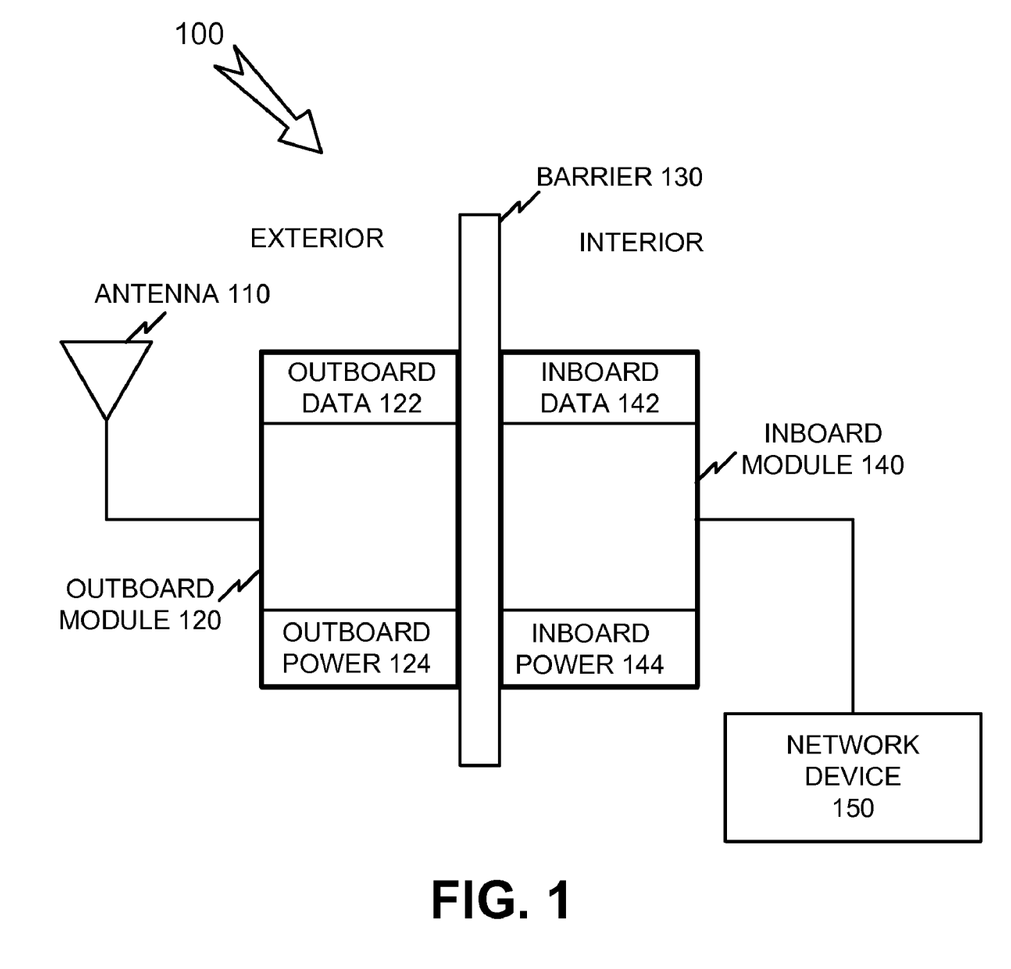
FIG. 1 illustrates an exemplary system that can be configured to operate in accordance with the principles of the invention.

FIG. 1 illustrates an exemplary system that can be configured to operate in accordance with the principles of the invention. System 100 may include an antenna 110, an outboard module 120, a barrier 130, an inboard module 140 and a network device 150. Antenna 110 may include a device to receive and transmit electromagnetic signals. In one implementation, antenna 110 may transmit RF signals adapted for use in wireless communication sessions. For example, antenna 110 may transmit code division multiple access (CDMA), time division multiple access (TDMA), global system for mobile communications (GSM), third generation mobile communications technology (3G), personal communications service (PCS), IEEE 802.11, and/or other types of RF signals for use in communication sessions.

Outboard module 120 may include components to modulate baseband information to produce a signal compatible with antenna 110 and to demodulate information received from antenna 110 into baseband information for use by other components in system 100. Outboard module 120 may be supported on an exterior surface, such as an exterior surface of barrier 130. Outboard module 120 may be exposed to the elements and may be sealed to prevent moisture and/or dirt from interacting with components making up outboard module 120.

In one implementation, outboard module 120 may include an outboard data module 122 and an outboard power module 124. Outboard data module 122 may include components adapted to send or receive information to/from inboard data module 142. For example, outboard data module 122 may receive modulated information from antenna 110 and send baseband data (i.e., data that is down converted) through barrier 130 to inboard data module 142. Outboard power module 124 may include components adapted to receive a waveform that can be used to power other components used in outboard module 120.

Barrier 130 may include a structure that acts as an interface. For example, barrier 130 may be an interface between an interior region, or environment, and an exterior region, or environment. Barrier 130 may be an exterior wall of a building, a window in an automobile, an exterior window in a building, a roof or ceiling of a structure, such as a building, etc. Implementations of barrier 130 may receive a substantially unobstructed RF signal on a first side, such as an exterior side, and an obstructed signal on a second side, such as an interior side. In one implementation, barrier 130 may act as an interface between a controlled environment, such as an interior environment in a building or an automobile, and an uncontrolled environment, such as the outdoors. Barrier 130 may be made of substantially any homogenous and/or aggregate material, such as wood, metal, glass, plastic, composite, brick, stucco, etc. In one implementation, barrier 130 may be made of any material that allows optical and/or magnetic signals to pass from a first side (e.g., an exterior facing side) to a second side (e.g., an interior facing side), or vice versa.

Inboard module 140 may include components to send a power signal to outboard module 120 and/or to send/receive a data signal to/from outboard module 120. Inboard module 140 may be located in a controlled environment, such as an office space or in a passenger compartment of a conveyance (e.g., an automobile, airplane, train, ship, etc.). For example, inboard module 140 may be supported on an interior side of barrier 130 when outboard module 120 is supported on an exterior side of barrier 130. Inboard module 130 may be connected to substantially any number of other devices and/or networks, such as network device 150.

In one implementation, inboard module 140 may include inboard data module 142 and inboard power module 144. Inboard data module 142 may include a device to receive data from another device, such as network device 150, and to make the received data available to a destination, such as outboard data module 122. Inboard data module 142 may further receive information from outboard data module 122 and may send the received information to a destination, such as network device 150. Inboard power module 144 may include a device to convert a first power signal into a second power signal that can be used to power a destination, such as outboard power module 124. In one implementation, the second power signal may include an electromagnetic power waveform that is adapted to pass through barrier 130. The electromagnetic power waveform may be adapted to produce a voltage and/or current in outboard module 120.

Network device 150 may include a device to send data to inboard module 140 or to receive data from inboard module 140. Implementations of network device 150 may include a processing device, such as a desktop computer, a laptop computer, a client, a server, a personal digital assistant (PDA), a cellular telephone, a web-enabled cellular telephone, or another computation or communication device. In one implementation, network device 150 may include components adapted to receive speech or data from a user and/or from another device (e.g., a handset) and to convert the speech and/or data into a format compatible with inboard module 140. Inboard module 140 may send the speech and/or data to outboard module 120 for transmission to a destination via antenna 110. In another implementation, network device 150 may provide power to inboard module 140, such as by supplying a determined voltage/current over a cable, such as a communications cable.

Implementations consistent with the principles of the invention may include substantially any number of antennas 110, outboard modules 120, barriers 130, inboard modules 140 and/or network devices 150 operating alone or in concert. Implementations may further include one or more antennas 110, outboard modules 120, inboard modules 140 and/or network devices 150 operating in a single network and/or domain and/or spread across multiple networks and/or domains.

Exemplary Coupling

Figure 2:
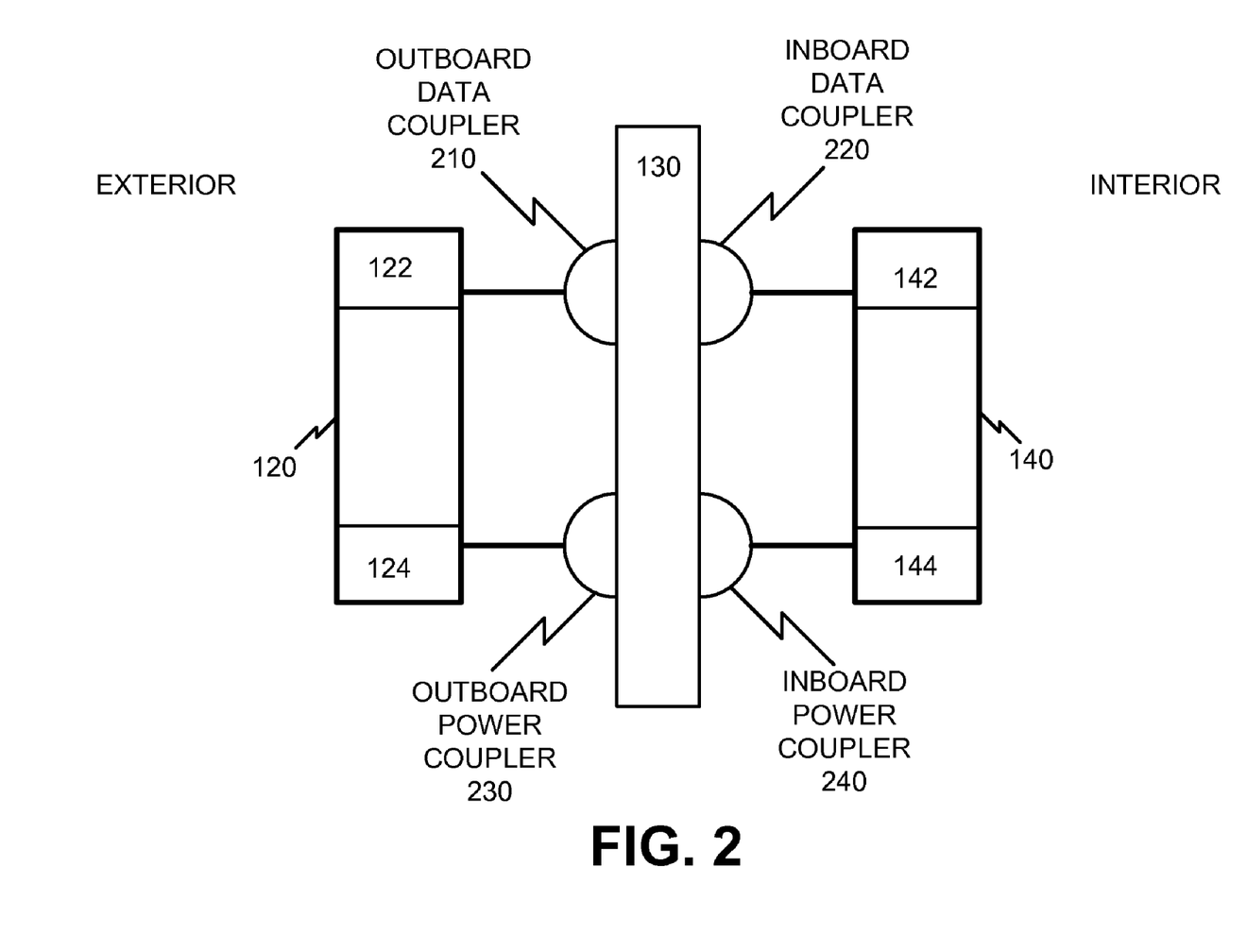
FIG. 2 illustrates an exemplary arrangement for coupling power and data through a structure consistent with the principles of the invention.

FIG. 2 illustrates an exemplary arrangement for coupling power and data through barrier 130 consistent with the principles of the invention. FIG. 2 may include outboard module 120 that includes outboard data module 122 and outboard power module 124, barrier 130, inboard module 140 that includes inboard data module 142 and inboard power module 144, outboard data coupler 210, inboard data coupler 220, outboard power coupler 230, and inboard power coupler 240. Outboard module 120, outboard data module 122, outboard power module 124, barrier 130, inboard module 140, inboard data module 142, and inboard power module 144 may operate as described in connection with FIG. 1.

Outboard data coupler 210 may include a device to provide an inbound data signal from outboard data module 122 to inboard data coupler 220 through barrier 130 and to receive an outbound data signal from inboard data coupler 220 through barrier 130. Inboard data coupler 220 may include a device to send an outbound data signal from inboard data module 142 to outboard data coupler 210 through barrier 130 and to receive an inbound data signal from outboard data coupler 210 through barrier 130. Outboard data coupler 210 and inboard data coupler 220 may be configured to maintain aligned signal pathways, such as magnetic and/or optical pathways, so that inbound and/or outbound signals can pass between outboard data module 122 and inboard data module 142 through barrier 130.

Implementations of outboard data coupler 210 and inboard data coupler 220 may be configured to allow signals, such as optical signals, to pass through barrier 130 without requiring that penetrations, such as holes or channels, be made through barrier 130. Outboard data coupler 210 and inboard data coupler 220 may include attachment devices, such as vacuum-based, adhesive-based, and/or magnetic-based attachment devices, to support outboard data coupler 210 or inbound data coupler 220 in a determined relationship on barrier 130. Outboard data coupler 210 and inboard data coupler 220 may receive signals from outboard data module 122 and inboard data module 142, respectively, via wires, optical fibers, etc.

Outboard power coupler 230 may include a device to receive a power signal, or waveform, from inboard power coupler 240 via barrier 130. Outboard power coupler 230 may send the power signal to outboard power module 124 so that outboard power module 124 can convert energy from the power signal into voltage and/or current to power components in outboard module 120, such as components in outboard data module 122.

Inboard power coupler 240 may include a device to send a power signal through a structure, such as barrier 130, to a destination, such as outboard power coupler 230. Outboard power coupler 230 and inboard power coupler 240 may be configured to receive/send a power signal through a structure without requiring that penetrations be made through the structure. Outboard power coupler 230 and inboard power coupler 240 may include vacuum-based, adhesive-based, magnetic-based, etc., attachment mechanisms. Outboard power coupler 230 and inboard power coupler 240 may receive/send signals from outboard power module 124 and/or inboard power module 144 via wires, optical fibers, etc.

Exemplary Power Supply

Figure 3:
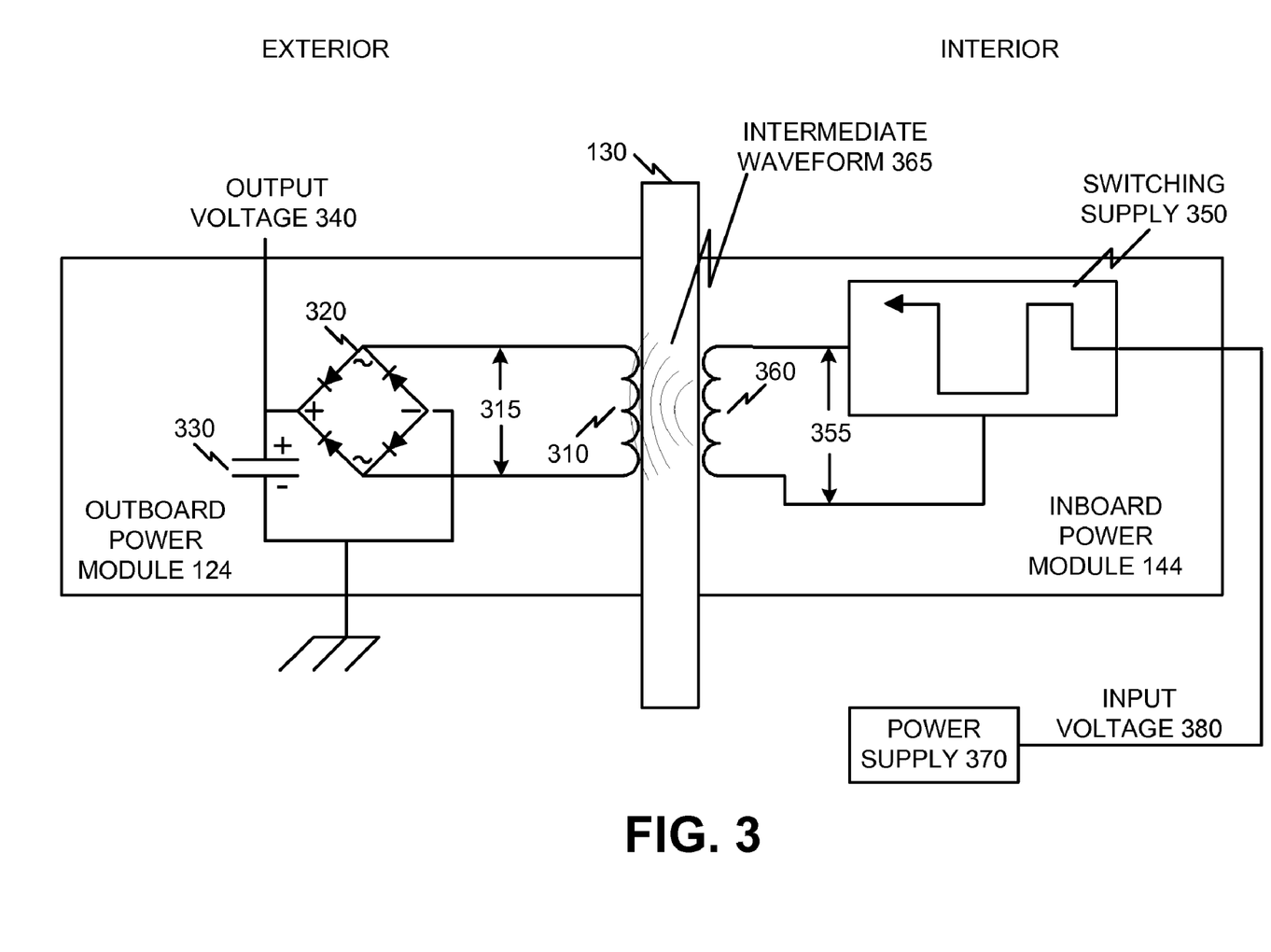
FIG. 3 illustrates an exemplary functional diagram of an outboard power module and an inboard power module that can be used to power an implementation consistent with the principles of the invention.

FIG. 3 illustrates an exemplary functional diagram of outboard power module 124 and inboard power module 144 that can be used to power an implementation of system 100 consistent with the principles of the invention. The implementation of FIG. 3 may include outboard power module 124, barrier 130, inboard power module 144, intermediate waveform 365, power supply 370, and input voltage 380.

Outboard power module 124 may include an outboard coil 310, a signal 315, a rectifier 320, a capacitor 330, and a direct current (DC) output voltage 340. Outboard power module 124 may receive an alternating current (AC) based waveform and may convert the AC-based waveform into a DC voltage for use by other components in outboard module 120 (e.g., data components). AC-based waveforms may include waveforms having substantially any shape, frequency and/or amplitude. For example, implementations of outboard power module 124 may be adapted to work with sinusoidal waveforms, pulse based waveforms, modulated waveforms, such as pulse width modulated (PWM) waveforms, and/or unmodulated waveforms.

Outboard coil 310 may include a device to receive an AC-based waveform and to produce an output signal, such as a voltage. In one implementation, outboard coil 310 may include a transformer winding and/or a core made of ferrous material. Other implementations may include other configurations of outboard coil 310. Outboard coil 310 may produce a voltage having a waveform similar to a waveform that was received by outboard coil 310. For example, when outboard coil 310 receives a sinusoidal signal via, for example, intermediate waveform 365, outboard coil 310 may produce a sinusoidal signal (e.g., signal 315) that is related to the received sinusoidal signal. Outboard coil 310 may send signal 315 to rectifier 320.

Rectifier 320 may include a device to receive an AC-based signal (e.g., signal 315) and to produce a DC voltage, such as output voltage 340. In one implementation, rectifier 320 may include a full-wave rectifier. Rectifier 320 may include filtering components and/or amplification/attenuation components for use in producing a DC output voltage 340 having desired characteristics, such as a desired amplitude value and/or noise level. Rectifier 320 may produce DC output voltage 340 that is referenced to a potential, such as ground, and/or that is floating with respect to ground. Outboard power module 124 may include capacitor 330 to filter unwanted signal components, such as noise, from output voltage 340.

Inboard power module 144 may include switching supply 350, a coil signal 355, and an inboard coil 360. Switching supply 350 may include a device to receive input voltage 380 and to produce an AC-based waveform, or signal, (e.g., coil signal 355) adapted for use with inboard coil 360. Switching supply 350 may include a ferro-resonant switching supply, also known as a switched-mode, or chopper, supply. A switched mode power supply is a power supply that accepts a DC voltage and converts the DC voltage to a waveform, such as a PWM waveform. Switched mode power supplies may be adapted to operate at substantially any frequency, such as frequencies in the low kilo-Hertz (kHz) region to frequencies on the order of hundreds of kHz. For example, implementations of switched mode power supplies that can be used with implementations of the invention may operate at frequencies on the order of 150 kHz, 250 kHz, 450 kHz, and/or other frequencies. Implementations of switching supply 350 may also operate to produce substantially any type of waveform (e.g., coil signal 355). In one implementation, waveforms used with switching supply 350 may be selected based on a composition and/or thickness of barrier 130, an input current to switching supply 350 and/or a desired current at an output of outboard power module 124.

Inboard coil 360 may include a device to receive a waveform from switching supply 350 and to send the waveform to outboard coil 310 as intermediate waveform 365 that is adapted to pass through barrier 130. In one implementation, inboard coil 360 may include a transformer winding and/or ferro-magnetic core. Inboard coil 360 may be designed so that a number of windings and/or wire size used in inboard coil 360 produces a desired voltage and/or current at an output side of outboard coil 310 after passing through barrier 130. Switching supply 350 and inboard coil 360 may be sized to account for energy losses caused by intermediate waveform 365 passing through barrier 130 and/or caused by components of outboard power module 124 and/or outboard data module 122.

Intermediate waveform 365 may include a waveform produced by inboard coil 360. Intermediate waveform 365 may be adapted to pass through barrier 130 to outboard coil 310. Intermediate waveform 365 may be selected based on the thickness and/or composition of barrier 130. Intermediate waveform 365 may further be selected based on an amount of output voltage 340 and/or output current needed to power components in outboard module 120.

Power supply 370 may include a device to provide power to switching supply 350. Implementations of power supply 370 may include AC or DC supplies. In one implementation, power supply 370 may include a power over Ethernet supply. For example, an Ethernet cable may be connected to inboard power module 144. The Ethernet cable may carry input voltage 380 that complies with IEEE 802.3AF (power over Ethernet standard). Switching supply 350 may convert an IEEE 802.3AF compliant input voltage into a waveform (coil signal 355) that is sent to inboard coil 360. In an alternative implementation, power supply 370 may be integrated into switching supply 350. For example, power supply 370 may provide an AC voltage to switching supply 350. Switching supply 350 may include a rectifier (not shown) to convert the AC input voltage into a DC voltage for use in generating coil signal 355.

Exemplary Outboard Data Module

Figure 4:
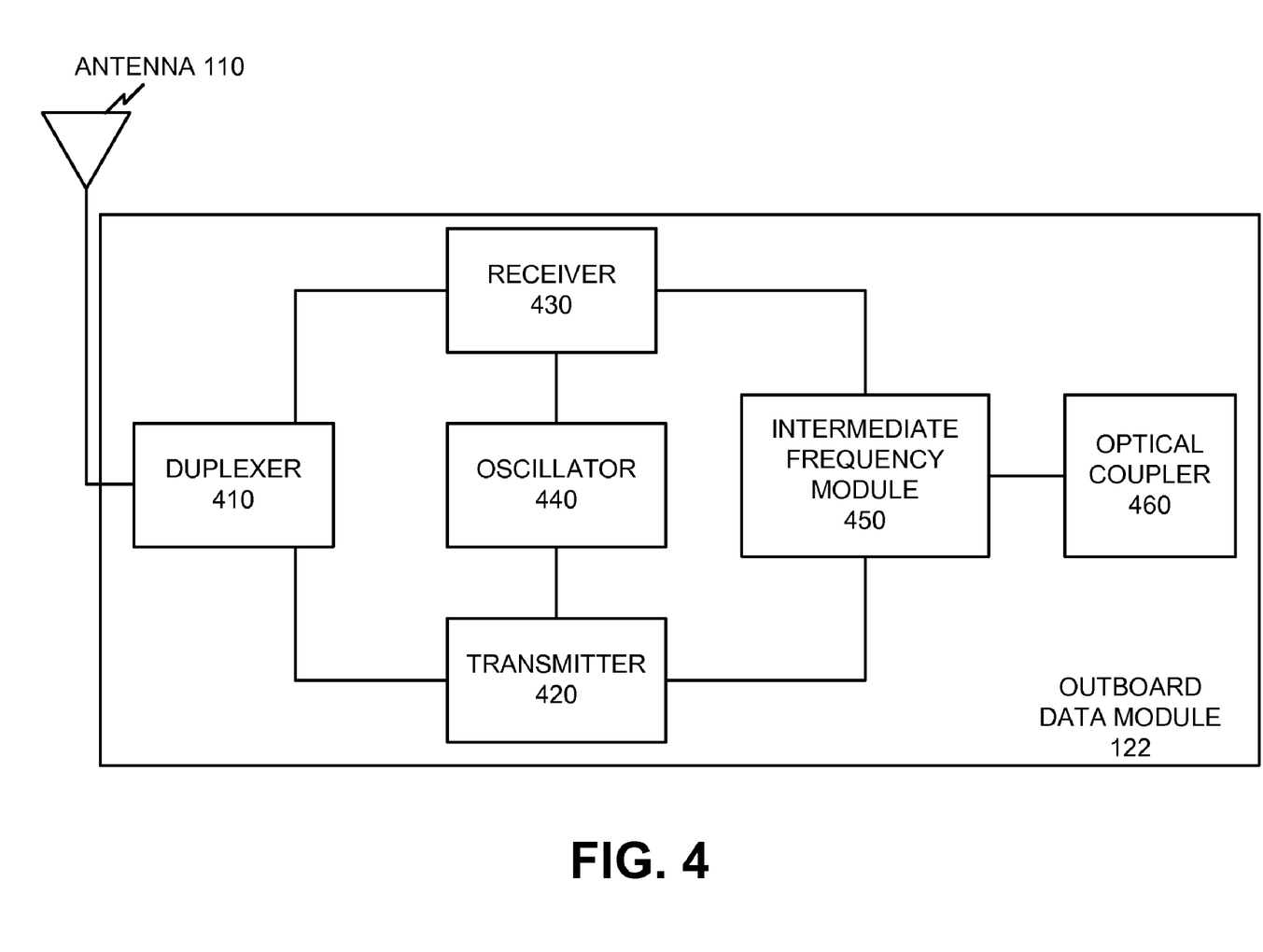
FIG. 4 illustrates an exemplary functional diagram of an outboard data module consistent with the principles of the invention.

FIG. 4 illustrates an exemplary functional diagram of outboard data module 122 consistent with the principles of the invention. Outboard data module 122 may include a duplexer 410, a transmitter 420, a receiver 430, an oscillator 440, an intermediate frequency (IF) module 450 and an optical coupler 460. Outboard data module 122 may include other devices that aid in receiving, processing, and/or transmitting data. Duplexer 410 may include a device that isolates transmitter 420 from receiver 430 while allowing transmitter 420 and receiver 430 to share antenna 110. Duplexer 410 may be adapted to operate in a frequency band used by transmitter 410 and receiver 430 and to handle an output power level used by antenna 110. Implementations of duplexer 410 may be adapted to operate with one or more antennas 110, e.g., a number of antennas operating at different frequencies.

Transmitter 420 may include a device to receive an IF modulated signal from IF module 450 and to make the received signal available to antenna 110 at a frequency range used by antenna 110. For example, transmitter 420 may receive a modulation signal from oscillator 440. Transmitter 420 may use the modulation signal to modulate the signal received from IF module 450. Transmitter 420 may modulate the signal received from IF module 450 to produce a modulated signal that has a carrier signal in a frequency range that is compatible with antenna 110 when antenna 110 is operating in a transmit mode. For example, if antenna 110 is configured to operate at a frequency on the order of 900 Mega-Hertz (MHz), transmitter 420 may modulate the signal received from IF module 450 to produce a modulated signal that is centered at approximately 900 MHZ, where the modulated signal includes information contained in the signal received from IF module 450.

Receiver 430 may include a device to receive an incoming modulated signal from antenna 110 and to send a demodulated incoming signal to IF module 450. Receiver 430 may receive a demodulation signal from oscillator 440 and may use the demodulation signal to demodulate a signal received from antenna 110. Receiver 430 may provide the demodulated incoming signal to IF module 450 in a format compatible with IF module 450.

Oscillator 440 may include a device to produce a signal that can be used by transmitter 420 and receiver 430. Oscillator 440 may include logic to provide a signal at a stable frequency. The signal produced by oscillator 440 may be centered at a frequency used by antenna 110. The signal produced by oscillator 440 may be used by transmitter 420 to modulate an outgoing signal. The signal produced by oscillator 440 may further be used by receiver 430 to demodulate an incoming signal received from antenna 110 to make the incoming signal compatible with downstream components, such as IF module 450.

IF module 450 may include a device to receive a signal at a first frequency and to produce a signal at a second frequency. For example, IF module 450 may receive a baseband signal from optical coupler 460. IF module 450 may modulate the baseband signal to a frequency (e.g., an intermediate or constant frequency) that can be used by transmitter 420 to produce a modulated outgoing signal that is compatible with antenna 110. IF module 450 may receive an incoming signal from receiver 430 that has a modulation component therein and may remove the modulation component to provide a baseband incoming signal to optical coupler 460.

Optical coupler 460 may include a device to convert an electrical signal into an optical signal that can be sent to another device, such as an optical detector. In one implementation, optical coupler 460 may be configured to operate as an optical transceiver. Optical coupler 460 may include one or more light emitting diodes (LEDs) that can convert an electrical signal into an optical signal and/or to convert an optical signal into an electrical signal. LEDs used with optical coupler 460 may emit light at visible wavelengths, near-visible wavelengths, infra-red wavelengths, and/or ultraviolet (UV) wavelengths. Implementations of optical coupler 460 may be selected based on a thickness, configuration (e.g., layered), and/or material of barrier 130. For example, an UV-based implementation of optical coupler 460 may be selected for a certain composition and/or thickness of barrier 130 and a visible light-based implementation of optical coupler 460 may be selected for another composition and/or thickness of barrier 130.

Implementations of optical coupler 460 may be configured to operate with analog or digital signals. For example, an implementation of optical coupler 460 may include an analog-to-digital (A/D) converter to convert baseband analog information received from IF module 450 into a series of digital pulses for transmission to a destination through barrier 130. Implementations of optical coupler 460 may also be configured with optical filter elements to reduce and/or remove out-of-band optical signals. For example, an optical filter may remove optical interference, such as interference caused by optical reflections and/or phase shifts.

Exemplary Inboard Data Module

Figure 5:
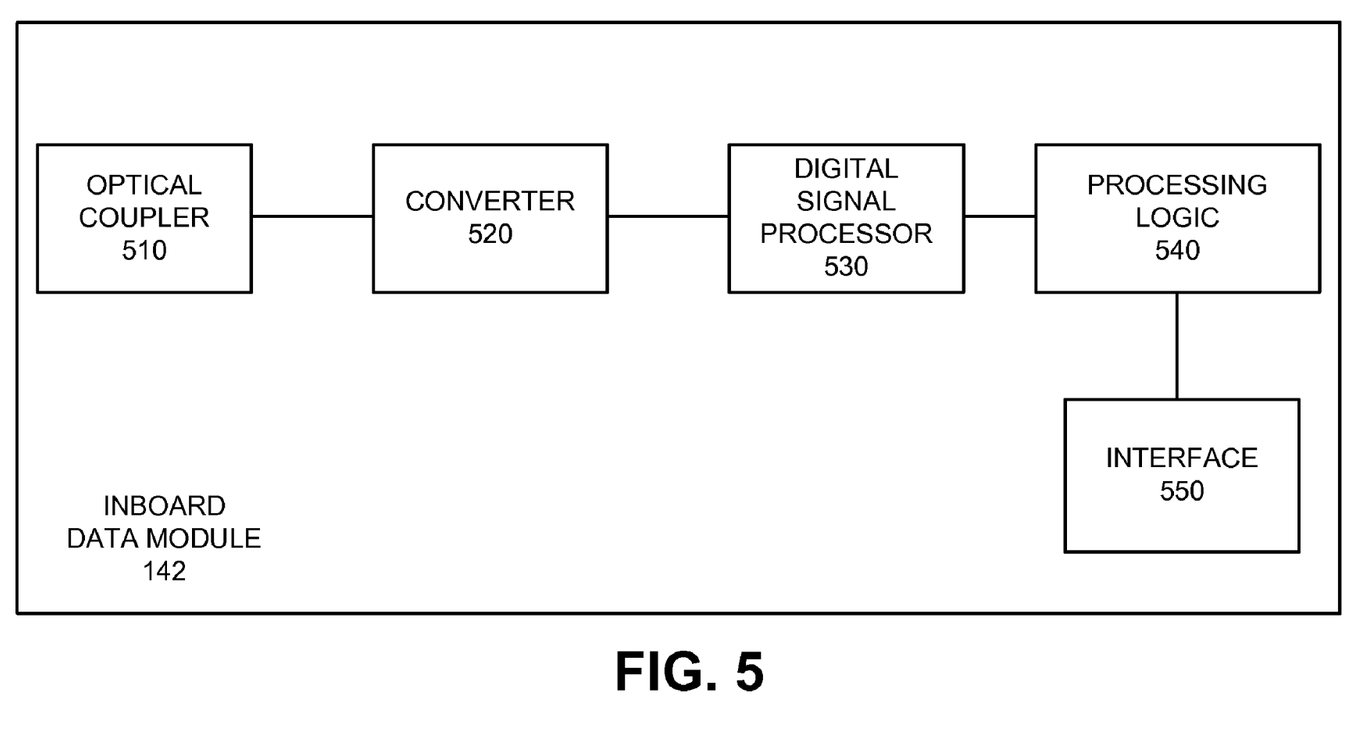
FIG. 5 illustrates an exemplary functional diagram of an inboard data module consistent with the principles of the invention.

FIG. 5 illustrates an exemplary functional diagram of inboard data module 142 consistent with the principles of the invention. Inboard data module 142 may include an optical coupler 510, a converter 520, a digital signal processor (DSP) 530, processing logic 540, and an interface 550. Inboard data module 142 may include other devices that aid in receiving, processing, and/or transmitting data. Optical coupler 510 may be similar and/or identical to optical coupler 460 (FIG. 4). For example, optical coupler 460 and optical coupler 510 may be configured to be bi-directional, to operate at the same optical wavelengths, to operate with the same types of optical signals (e.g., analog or digital), and/or to operate with the same types of optical filtering elements. Optical coupler 510 may receive optical information from optical coupler 460 and may provide an electrical signal to converter 520.

Converter 520 may include a device to convert an analog signal into a digital signal and/or to convert digital signals into analog signals. Converter 520 may include amplification and/or filtering logic to provide signal conditioning to an analog input or output signal and/or a digital output or input signal. Converter 520 may provide a digital signal to DSP 530 and/or may receive a digital signal from DSP 530 and produce an analog signal for use by optical coupler 510. Implementations of converter 520 may be omitted from implementations of inboard data module 142 that are configured to have optical coupler 510 output a digital signal that is compatible with DSP 530.

DSP 530 may include logic to process a digital signal received from converter 520 and/or optical coupler 510 and to produce a result that can be used by processing logic 540. DSP 530 may further be configured to convert information received from processing logic 540 into a format compatible with converter 520. DSP 530 may perform operations on information received from converter 520, such as reformatting, scaling, converting, decrypting, etc.

Processing logic 540 may include a device to perform processing on information received from network device 150 and/or DSP 530. Processing logic 540 may include any type of processing device. Implementations of processing logic 540 may include storage logic for storing instructions and/or data. Processing logic 540 may receive data from network device 150 and may convert the data into a format that can be used by DSP 530.

Interface 550 may include logic to send information to network device 150 and/or to receive information from network device 150. Interface 550 may implement communication protocols, security protocols, and/or other protocols to facilitate communication with network device 150, other devices, and/or networks. In one implementation, interface 550 may include logic to receive a power signal, such as a power over Ethernet signal, and to provide the power signal to inboard power module 144. Interface 550 may operate with optical and/or electrical signals.

Exemplary Process

Figure 6:
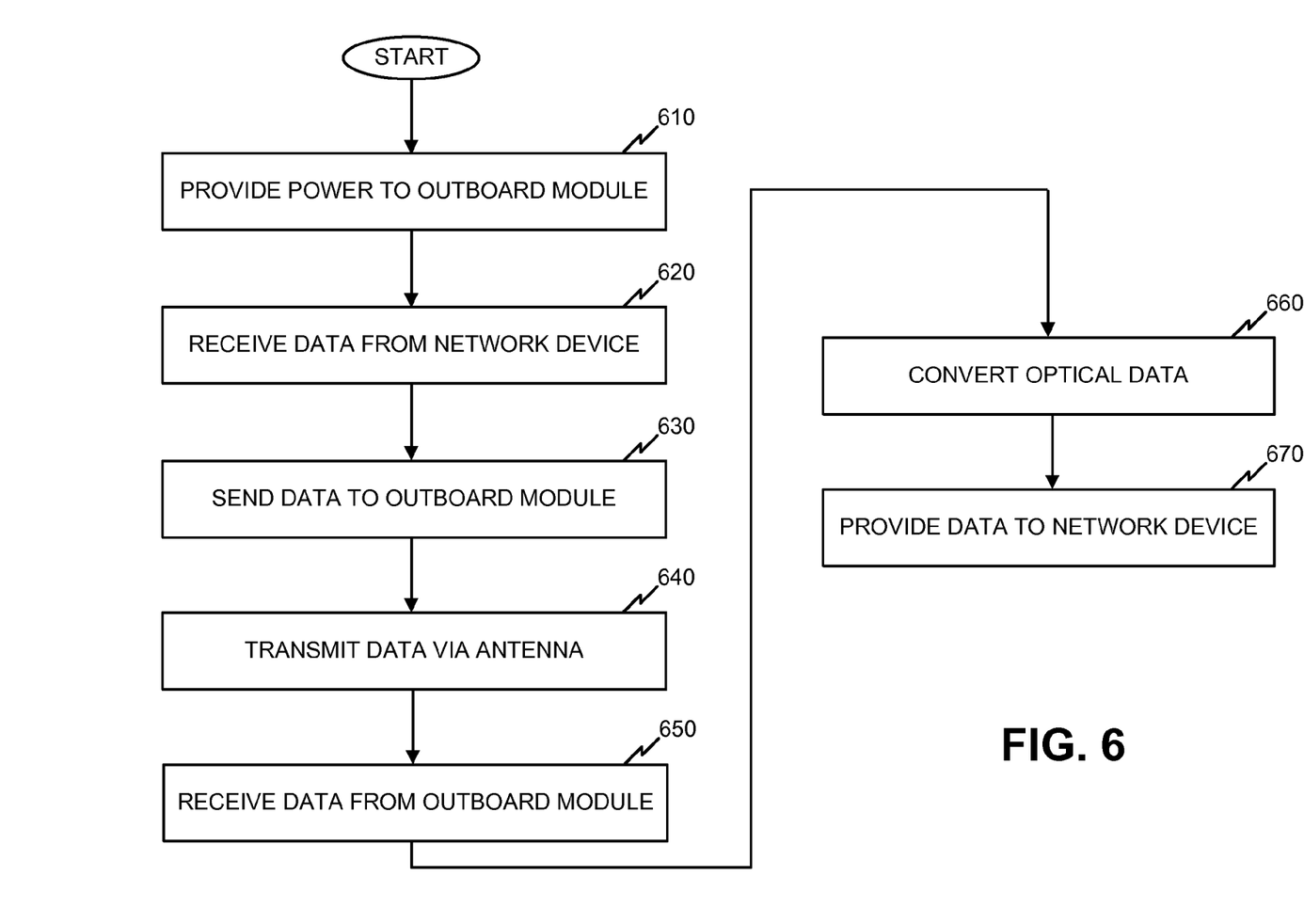
FIG. 6 illustrates an exemplary process consistent with the principles of the invention.

FIG. 6 illustrates an exemplary process consistent with the principles of the invention. Antenna 110 may be located in an outdoor environment where RF signals can be sent to or received from a device without requiring that the RF signals pass through obstructions that can significantly attenuate the RF signal. For example, antenna 110 may be mounted outdoors where antenna 110 can receive unimpeded signals from a base station, satellite, radio station, television station, wireless fidelity (Wi-Fi) hotspot, etc. When antenna 110 is located outdoors, an SNR at antenna 110 may be on the order of 20 Decibels (dB) higher than an SNR reaching antenna 110 when antenna 110 is located indoors. As a result, performance of a wireless device connected to antenna 110 may be enhanced when antenna 110 is located outdoors as compared to wireless device performance when antenna 110 located indoors.

Implementations may allow antenna 110 to be coupled to downstream components, such as a processor, without requiring penetrations through structures, such as barrier 130, on which antenna 110 and/or outboard module 120 may be supported. In one implementation, outboard module 120 may be connected to antenna 110. Outboard module 120 and antenna 110 may be supported on an exterior surface of barrier 130, such as an exterior facing surface of a window. Inboard module 140 may be supported on a surface of barrier 130 that opposes the exterior surface of barrier 130. For example, inboard module 140 may be supported on an interior surface of barrier 130 and may be positioned with respect to outboard module 120 to send power to outboard module 120 and/or to send or receive data to/from outboard module 120.

Processing may begin with inboard power module 144 providing power to outboard module 120 (block 610). In one implementation, inboard power module 144 may provide power to outboard power module 124 via switching supply 350. Switching supply 350 may receive an input voltage 380 and may produce a voltage waveform (e.g., coil signal 355, FIG. 3) that is adapted to operate with inboard coil 360 to produce intermediate waveform 365. Inboard coil 360 may include windings that are sized and arranged to produce a desired intermediate waveform 365. Implementations of intermediate waveform 365 may be selected so as to pass through barrier 130 to a destination, such as outboard coil 310. Intermediate waveform 365 may be adapted to transfer energy to outboard coil 310. For example, switching supply 350 may be configured to produce a voltage waveform (e.g., coil signal 355) having a determined amplitude, frequency, and pulse shape. The voltage waveform may be selected so as to produce a desired intermediate waveform 365 when the voltage waveform passes through inboard coil 360. Intermediate waveform 365 may be configured to have a determined amplitude, frequency and pulse shape at outboard coil 310. Parameters related to switching supply 350, inboard coil 360, intermediate waveform 365 and/or outboard coil 310 can be selected based on an input voltage 380 and/or input current available to switching supply 350, an efficiency of inboard coil 360 and/or outboard coil 310, transmission characteristics of barrier 130 with respect to intermediate waveform 365, and/or an amount of output voltage 340 and/or output current needed to power outboard module 120 and/or antenna 110.

Outboard coil 310 may receive intermediate waveform 365 and may produce an AC-based voltage (e.g., signal 315, FIG. 3) that is fed to rectifier 320. Rectifier 320 may convert the AC-based voltage to a DC voltage that can be used by components in outboard module 120. Rectifier 320 may be designed to provide a determined DC voltage, e.g. output voltage 340, at a determined current.

Inboard module 140 may receive data from network device 150 (block 620). In an implementation, network device 150 may provide data, such as a message, to interface 550 (FIG. 5). Interface 550 may send the message to processing logic 540, where processing logic 540 may convert the message into a format compatible with DSP 530. Processing logic 540 may send the message to DSP 530, where DSP 530 may convert the message into a series of digital pulses. DSP 530 may send the series of digital pulses to converter 520 as a serial stream, or pulse train.

Converter 520 may convert the serial stream into an analog signal that is representative of information in the serial stream. Converter 520 may produce an analog signal that is fed to optical coupler 510. Optical coupler 510 may convert the analog signal into an optical signal that is adapted to pass through barrier 130. Optical coupler 510 may be selected based on characteristics of barrier 130, a desired transmission bandwidth through barrier 130, characteristics of inboard power module 144, etc. Implementations of optical coupler 510 may be matched with optical coupler 460 based on operating parameters of system 100. For example, optical couplers 460 and 510 may be selected to operate with a certain wavelength of light, such as visible, UV, etc., and/or certain modulation techniques, such as PWM, amplitude modulation, etc. Optical coupler 510 and/or optical coupler 460 may include optical filters to reduce signal distortion, reflections (e.g., reflections that may arise when passing an optical signal through a barrier 130 that includes two glass panes separated by an air gap and/or a glass pane having a coating thereon), etc.

Optical coupler 510 may send the data to outboard module 122 (block 630). For example, optical coupler 460 may receive an optical signal from optical coupler 510. Assume optical coupler 460 may receive information making up the message via the optical signal received from optical coupler 510. Optical coupler 460 may convert the received optical signal into an analog or digital electrical signal. Information in the analog or digital electrical signal may be related to information in the optical signal received via barrier 130. Optical coupler 460 may send the electrical signal to IF module 450. IF module 450 may modulate information in the electrical signal via an intermediate frequency (IF) to produce an IF signal. IF module 450 may send the IF signal to transmitter 420. Transmitter 420 may receive a modulation signal from oscillator 440 and may modulate the IF signal to produce a modulated signal that is compatible with antenna 110. Transmitter 420 may send the modulated signal to duplexer 410. Duplexer 410 may send the modulated signal to antenna 110. The data may be sent to a destination via antenna 110 (block 640). For example, antenna 110 may send an RF signal that includes the information to a destination, such as a base station, a wireless device, etc.

Antenna 110 may receive an RF signal and may send the received signal to duplexer 410. Duplexer 410 may send the received signal to receiver 430 and receiver 430 may demodulate the received signal using a signal from oscillator 440. Receiver 430 may produce an IF modulated received signal that is compatible with IF module 450. IF module 450 may demodulate the IF modulated received signal to produce a baseband received signal that can be used by optical coupler 460. For example, IF module 450 may produce a baseband analog or digital signal that can be used by optical coupler 460 to produce an optical signal for transmission through barrier 130 to a destination, such as inboard module 140.

Inboard module 140 may receive data from outboard module 120 (block 650). For example, optical coupler 460 may send an optical signal through barrier 130 to optical coupler 510. The optical signal received by optical coupler 510 may include information, such as speech and/or data, that is contained in the signal received via antenna 110. Optical coupler 510 may convert the optical signal into an electrical signal that is sent to converter 520 (block 660). Converter 520 may filter and digitize the signal received from optical coupler 510. Converter 520 may provide a digital stream, such as a serial stream, to DSP 530. The digital stream may include information that is in the optical signal that was sent from optical coupler 460 to optical coupler 510. DSP 530 may convert the serial stream into another format, such as a parallel format. DSP 530 may further process information received from A/D converter 530, such as by performing error detection and/or correction. DSP 530 may send the processed information to processing logic 540. Processing logic 540 may perform additional processing on information received from DSP 530 and may send the further processed information to interface 550 as a message.

Interface 550 may send the message to network device 150 (block 670). In one implementation, interface 550 may convert the message into a format compatible with a communication protocol, such as a communication protocol used by network device 150. Interface 550 may be configured to communicate via substantially any type of communication protocol, such as packet-based communication protocols, non-packet based communication protocols, etc. In addition, interface 550 may be configured to send information to network device 150 via a wired link using electrical and/or optical signals and/or a wireless RF or free-space optical link.

Network device 150 may include substantially any type of device, such as a handset for a communication device, a computer, a network device, an application specific device (e.g., a radio, an industrial machine, a testing device, an appliance, etc.), and/or a network, such as a local area network.

CONCLUSION

Implementations consistent with the principles of the invention may allow placement of an antenna in an environment where signal loss between a transmitter and the antenna and/or the antenna and a receiver can be minimized. In an implementation, the antenna and an outboard electronics module are optically and electromagnetically coupled to an inboard electronics module without requiring the use of penetrations through a structure located between the outboard electronics module and the inboard electronics module. Implementations may further separate a power portion of an implementation from a signal portion of an implementation. The power portion may be adapted to send intermediate waveforms from an inboard side through a structure to an outboard side, where the intermediate waveforms are converted to a voltage via components in the outboard module. The signal portion may send an optical information signal from the inboard side through the structure to the outboard side, where the optical signal may be converted into an electrical signal for use with an antenna. The antenna may be used to send information to a destination.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than a restrictive sense.

For example, implementations consistent with the principles of the invention can be implemented using devices and configurations other than those illustrated in the figures and described in the specification without departing from the spirit of the invention. Devices and/or components may be added and/or removed from the implementations of FIGS. 1-5 depending on specific deployments and/or applications. Further, disclosed implementations may not be limited to any specific combination of hardware, software and/or firmware. In addition, while a series of acts has been described with respect to FIG. 6, the order of acts in FIG. 6 may be varied in other implementations. Moreover, non-dependent acts may be implemented in parallel.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A system, comprising: an inboard module, comprising: a power module to: receive power from a network device, use the received power to produce a waveform that passes through an opaque barrier, and cause the waveform to pass through the barrier, and a data module to: receive information signals that wirelessly passes through the barrier, where the information signals are analog information signals, convert the received analog information signals to digital information and provide the detail information signals to the network device; and an outboard module that is physically unattached to the inboard module, comprising: an outboard power module to: receive the waveform via the barrier, and use energy from the waveform to produce an output voltage, and an outboard data module comprising an antenna, where the outboard data module is to: receive the output voltage from the outboard power module, use the received output voltage to power the antenna, receive information via the antenna, generate a particular information signal based on the information, and cause the particular information signal to be wirelessly sent through the barrier to the data module.

2. The system of claim 1, where the data module sends a wireless data signal through the barrier to the outboard data module.

3. The system of claim 1, where the waveform is an electromagnetic waveform.

4. The system of claim 1, where the information signal is an optical signal.

5. The system of claim 4, where the data module further comprises:
   an optical filter to remove out-of-band wavelengths from the information signal.

6. The system of claim 4, where the data module further comprises:
   a conversion component to convert the optical signal into an electrical signal, and
   an interface to make the information available to a downstream device.

7. The system of claim 1, where the outboard power module comprises:
   a rectifier to transform the received waveform into the output voltage.

8. The system of claim 1, where the inboard module or the outboard module is supported on the barrier by an attachment device.

9. The system of claim 8, where the attachment device comprises a vacuum-based, magnetic-based, or adhesive-based device.

10. The system of claim 8, where the attachment device is to:
    pass the information signal from a first side of the barrier to a second side of the barrier or to pass the waveform from the second side to the first side.

11. The system of claim 1, where the opaque material comprises wood, metal, brick, stucco, composite, or plastic.

12. The system of claim 1, where when the data module is to provide the digital information signals to the network device, the data module is further to perform at least one of:
reformatting the digital signal,
scaling the digital signal,
decrypting the digital signal,
detecting an error in the digital signal, or
correcting an error in the digital signal.

13. A method, comprising:
receiving, by a first module, power from a network device;
generating, by the first module, an energy signal, using the received power;
sending the energy signal, that passes through opaque materials, from the first module to a second module, where the first module is supported on a first side of a barrier that includes the opaque materials, where the second module is supported on a second side of the barrier, and where the first and second modules are physically unconnected;
receiving, by the first module and from the network device, a digital signal;
converting, by the first module, the digital signal to an analog signal;
sending a data signal, based on the analog signal, from the first module to the second module, where the data signal is separate from the energy signal;
receiving, by the second module, the sent data signal;
powering a transmitter in the second module using the energy signal; and
transmitting the received data signal from the second module via the transmitter.

14. The method of claim 13, where the digital signal is a first digital signal, where the analog signal is a first analog signal, and where the data signal is a first data signal, the method further comprising:
receiving, by the second module via the transmitter, a second data signal;
sending a second analog signal, that is based on the second data signal, from the second module to the first module;
receiving, by the first module, the second analog signal from the second module;
converting the second analog signal to a second digital signal; and
providing the second digital signal to the network device.

15. The method of claim 13, further comprising:
filtering the data signal prior to the sending of the data signal to the second module.

16. A communication device, comprising:
an outdoor module supported on a first side of a structure, the outdoor module comprising:
a power module to:
receive an intermediate waveform through the structure from a power source supported on a second side of the structure, where the power source and the outdoor module are physically unattached, where the waveform passes through opaque materials, where the waveform is generated by the power source based on a power signal received by the power source from a network device, and where the waveform is based on at least one of:
a composition of the structure,
a thickness of the structure, or
a desired output current; and
convert the intermediate waveform into a supply voltage;
a data module to:
receive the supply voltage from the power module to power a receiver,
receive an incoming wireless signal via the receiver, and
transmit information in the incoming wireless signal to a transceiver supported on the second side, where the data module and the transceiver are physically unattached; and
an indoor module supported on the second side of the structure to:
receive, from the transceiver, an analog signal that includes the information in the incoming wireless signal,
convert the analog signal to a digital signal that includes at least some of the information in the incoming wireless signal, and
provide the digital signal to the network device.

17. The communication device of clam 16, further comprising a digital signal processor to process the digital signal before the indoor module provides the digital signal to the network device, where when processing the digital signal, the digital signal processor is to perform at least one of:
reformatting the digital signal,
scaling the digital signal,
decrypting the digital signal,
detecting an error in the digital signal, or
correcting an error in the digital signal.

* * * * *